(No Model.)
R. VARLEY, Jr.
ELECTRICAL TESTING INSTRUMENT.
No. 465,809. Patented Dec. 22, 1891.
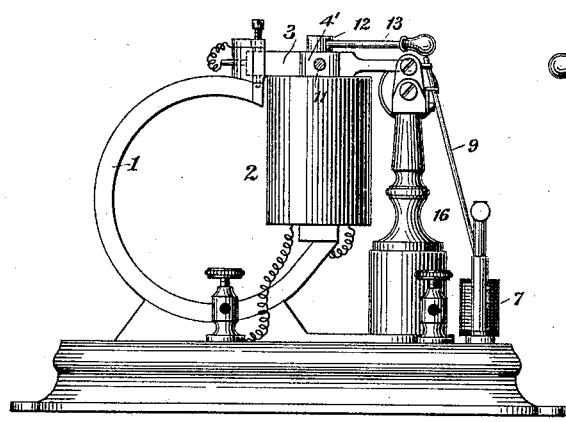
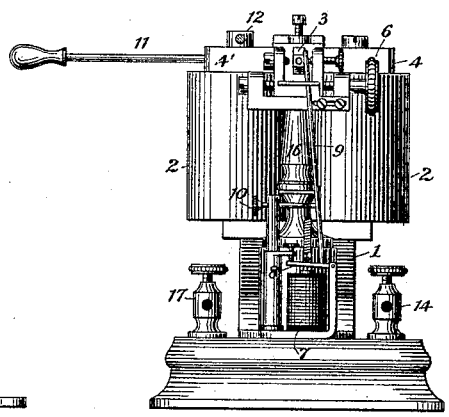
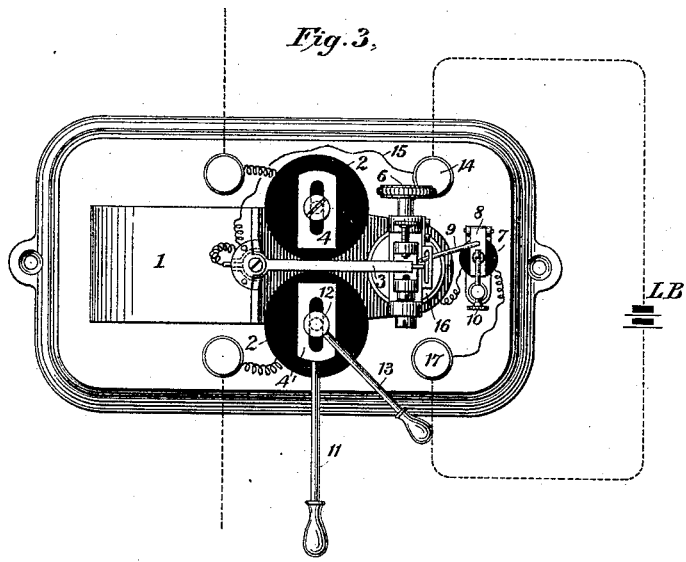
Witnesses
Geo. W. Breck
Edward Thorpe
Inventor
Richard Varley Jr.
By his Attorney
Rust & Worthington

UNITED STATES PATENT OFFICE.

RICHARD VARLEY, JR., OF ENGLEWOOD, NEW JERSEY.

ELECTRICAL TESTING-INSTRUMENT.

SPECIFICATION forming part of Letters Patent No. 465,809, dated December 22, 1891.

Application filed January 15, 1891. Renewed November 9, 1891. Serial No. 411,257. (No model.)

*To all whom it may concern:*

Be it known that I, RICHARD VARLEY, Jr., a citizen of the United States, residing at Englewood, in the county of Bergen and State of New Jersey, have invented certain new and useful Improvements in Electrical Testing-Instruments; and I do hereby declare the following to be a full, clear, and exact description of the invention, such as will enable others skilled in the art to which it appertains to make and use the same.

This invention relates to a testing-instrument; and its principal object is to locate a very minute insulation fault in an electric wire. One way of finding a fault in a coil where the resistance of the fault is one hundred thousand ohms or less is to connect the coil with one side of a circuit, including a battery of suitable electro-motive force and an ordinary relay provided with a retractile spring, and partially immerse the coil in water, the other side of the circuit being in electric connection with the water. On turning the coil in the fluid, when the fault enters the water the relay will be energized, and by closing a local circuit an alarm will give notice to the operator that the fault exists. This method is, however, attended with difficulty, inasmuch as the current passing through the relay is so weak that a most delicate adjustment of the retractile spring must be made to permit it to respond faithfully to the current when it passes. Besides this, such a method is attended with the further difficulty that on moving the coil the superficial leakage due to the film of water on the insulation permits the fault to be carried some distance away from the surface of the liquid before the alarm will cease to ring, and as such a manipulation must be made for each turn of wire in the coil until the particular turn in which the fault exists is definitely located it is evident that much time must be consumed before the exact location of the fault is definitely determined. When the fault resistance approaches the insulation resistance of the coil, the current passing through the fault would be very weak. The retractile spring must therefore be very weak and the armature of the relay delicately poised.

My invention dispenses with the annoyance and loss of time incident to the use of a relay provided with a retractile spring; and it consists in providing a relay or other electro-magnetic device the armature of which is given a normal bias in one direction, but is adapted to have this bias reversed when current passes through its coils.

The invention more specifically consists in an instrument having a polarized armature pivoted so as to rock in a magnetic field, which may be reversed when the fault enters the liquid.

The invention also comprises structural details, which will be hereinafter specifically described, and then pointed out in the appended claims.

In the accompanying drawings, which illustrate the invention, Figure 1 is a side elevation of a device comprising my improvements. Fig. 2 is an end view of the same, and Fig. 3 is a plan view.

The instrument as illustrated comprises a permanent magnet 1, having the core of an electro-magnet 2 mounted upon one pole and an armature 3 pivotally and magnetically connected with the other pole in a manner well understood by those familiar with polarized relays. Each limb of the electro-magnet is provided with an adjustable pole-piece 4 4'. The armature 3 plays between two stops 5 6, one of which is in circuit with an electro-magnet 7, the other of which is insulated from the supporting-standard. The electro-magnet 7 is provided with a pivoted armature 8, which carries a finger 9, which lies in the path of the polarized armature 3. The armature 8 is provided with a retractile spring and an adjusting-button 10 for varying its retractile force. For convenience of adjustment one of the movable pole-pieces, as 4', is provided with a handle 11, and said pole-piece may be locked in any position of adjustment by a jam-nut 12, controlled by the handle 13.

In adjusting the apparatus the pole-piece 4' is so set that the armature is given a slight tendency to remain against its insulated stop. The terminals of the coils of electro-magnet 2 are put in circuit with the water and the coil to be tested in a manner similar to that hereinbefore described. When a fault in a coil enters the water, the circuit is completed through the coils of electro-magnet 2. The connections are so made that when current flows a reversal of polarity will be created in the field in which the armature 3 is pivoted. The armature, therefore, is thrown from its insulated contact to the contact-stop 6. This closes the local circuit from the battery LB by way of binding-post 14, wire 15, armature 3, contact-stop 6, support 16, electro-magnet 7, and post 17. This energizes magnet 7, which attracts its armature 8 and causes the projecting finger 9 to throw the tongue of the relay back to the insulated stop, opening the local circuit and permitting the armature of magnet 7 to retract. The polarity developed by the testing-current, however, which now exerts a constant bias upon the armature 3 toward contact-stop 6 so long as the fault remains in the water, will immediately throw back the armature 3 to the conducting-stop 6, again closing the circuit and causing the electro-magnet 7 to return it to its initial position. It will thus be evident that so long as the fault remains in water the polarized armature will be kept in vibration. The buzzing noise created by its vibration is sufficient to indicate to the operator that a fault exists. It will be understood, however, that in places where the noise is sufficient to interfere with accuracy of hearing the sound of the buzzer an electric bell or other device may be placed in circuit with the local battery.

The electro-magnet 7 is preferably located at the base of the instrument and in line with the polarized armature, or nearly so, in order to prevent interference with a sensitive action of the polarized armature by reason of the inductive influence exerted by the electro-magnet 7.

By widening or reducing the distance between the adjustable pole-piece 4 4' the strength of the magnetic field may be delicately varied and a very slight bias given to the polarized armature. The electro-magnet operated by the local circuit to return the polarized armature to its initial position might under some circumstances operate directly upon the armature or an armature connected thereto; but I prefer the arrangement hereinbefore described. The essential feature of the invention, however, is giving the armature a normal magnetic bias in one direction, which bias is reversed upon flow of the current through a fault in the coil being tested, and then automatically restoring the armature to its initial position.

While the instrument has been described with reference to testing, it might with advantage be employed wherever a great delicacy of adjustment and a continuous alarm is required.

The advantage of this instrument is that it will ring a bell immediately upon a fault entering the water, and will cease immediately upon the fault leaving the water, for it will be understood that instantly on the testing-circuit being opened the polarized armature will remain against its insulated stop, there being no longer any bias toward the other stop, and that a mere increase of resistance when the fault leaves the water will be sufficient to react upon the magnetic field in which the polarized armature swings, in such a way as to prevent the normal bias of the armature being disturbed. Although, therefore, there may be current flowing in the testing-circuit due to leakage over the film of water after the fault has left it, the cessation of the alarm will indicate that the fault is out of water, and it may be very quickly and definitely located. It will thus be seen that a retractile spring is entirely dispensed with.

The use of a retractile spring of any description would render the instrument useless for locating small faults, for the reason that the current which passes through the fault is very weak, and if the tension is so reduced as to allow the armature to be attracted it would be insufficient to draw it away on cessation of current, inasmuch as in the attracted position it remains in a denser magnetic field than in a retracted position.

Having thus described my invention, what I claim as new, and desire to secure by Letters Patent, is—

1. A testing-instrument comprising a polarized armature supported in a magnetic field with a normal bias toward one pole, a coil for creating a bias toward the other pole, and an electro-magnet actuated by the armature when shifted under such change of bias to impel it toward its initial position, whereby a continuous vibration of the armature is maintained during the passage of current through the coil.

2. A testing-instrument comprising a pivoted polarized armature supported between two magnet-poles of like sign, means for varying the adjustment of the armature relatively to the poles, so as to give it a normal bias toward one of them, a coil for creating a bias toward the other pole when current passes, and means for automatically impelling the armature toward its initial position after being shifted.

3. A testing-instrument comprising a polarized relay and a magnet in the local circuit to automatically restore the relay-armature to its initial position whenever actuated.

4. A polarized relay provided with a sliding pole-piece, an adjusting-arm connected thereto, and a locking device provided with an operating-arm, carrying a jam-nut for securing the pole-piece in any position of adjustment.

In testimony whereof I affix my signature in presence of two witnesses.

RICHARD VARLEY, JR.

Witnesses:
VICTOR E. BURKE,
E. C. GRIGG.